Oct. 23, 1934.                L. D. SOUBIER                 1,977,956
              METHOD AND APPARATUS FOR MAKING GLASS CANE
                  Filed May 18, 1933        3 Sheets-Sheet 1
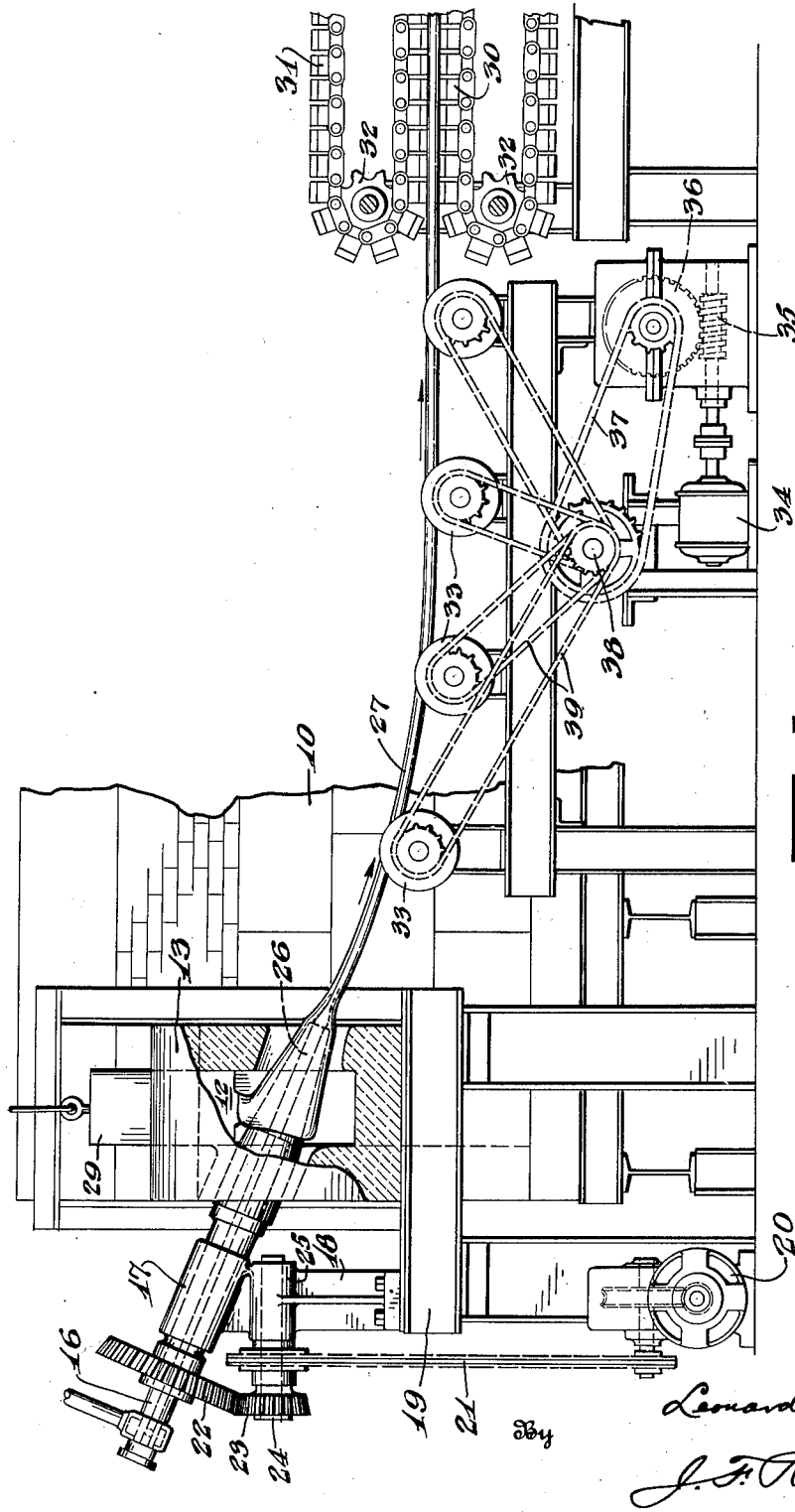
Inventor
Leonard D. Soubier
By
J. F. Rule  Attorney Oct. 23, 1934.   L. D. SOUBIER   1,977,956
METHOD AND APPARATUS FOR MAKING GLASS CANE
Filed May 18, 1933   3 Sheets-Sheet 2
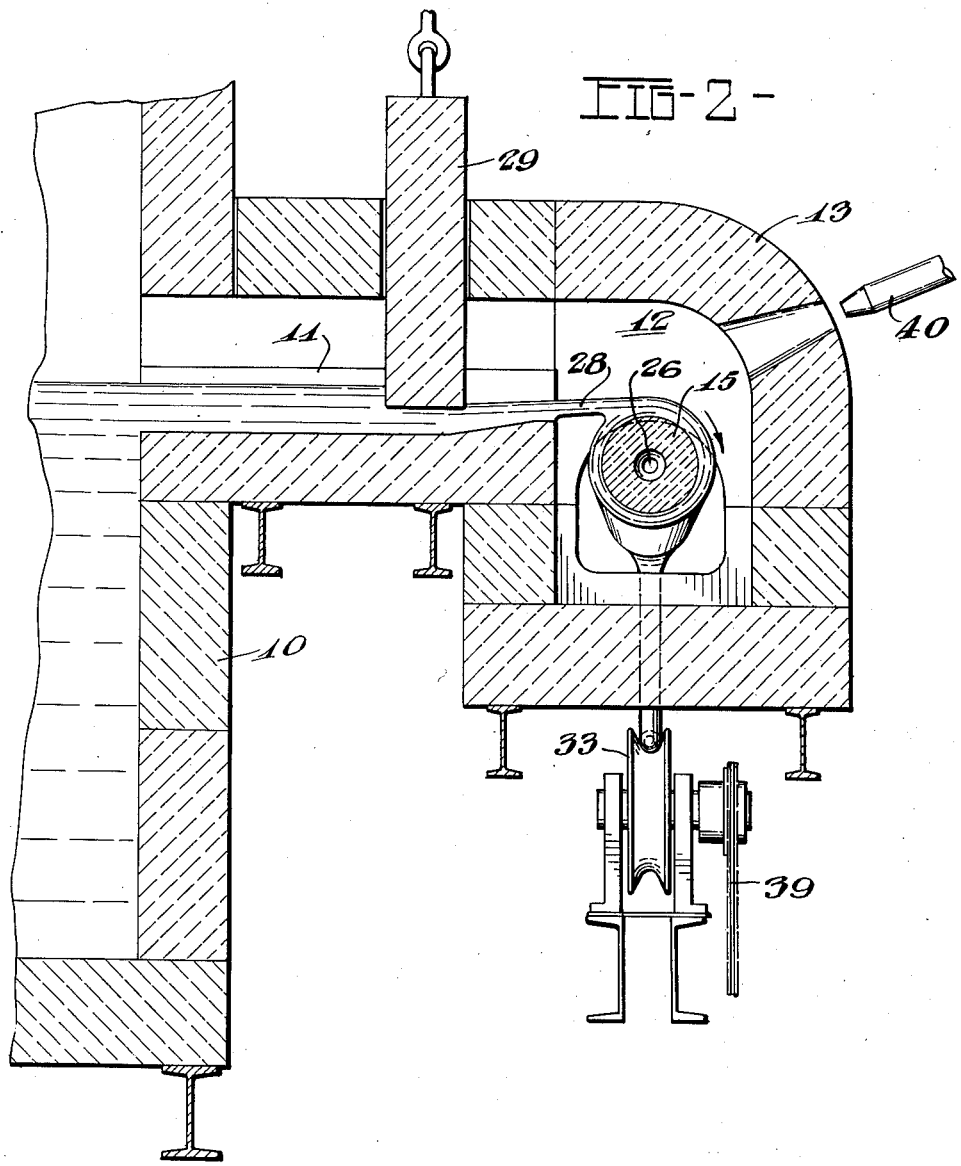

Oct. 23, 1934.  L. D. SOUBIER  1,977,956
METHOD AND APPARATUS FOR MAKING GLASS CANE
Filed May 18, 1933    3 Sheets-Sheet 3
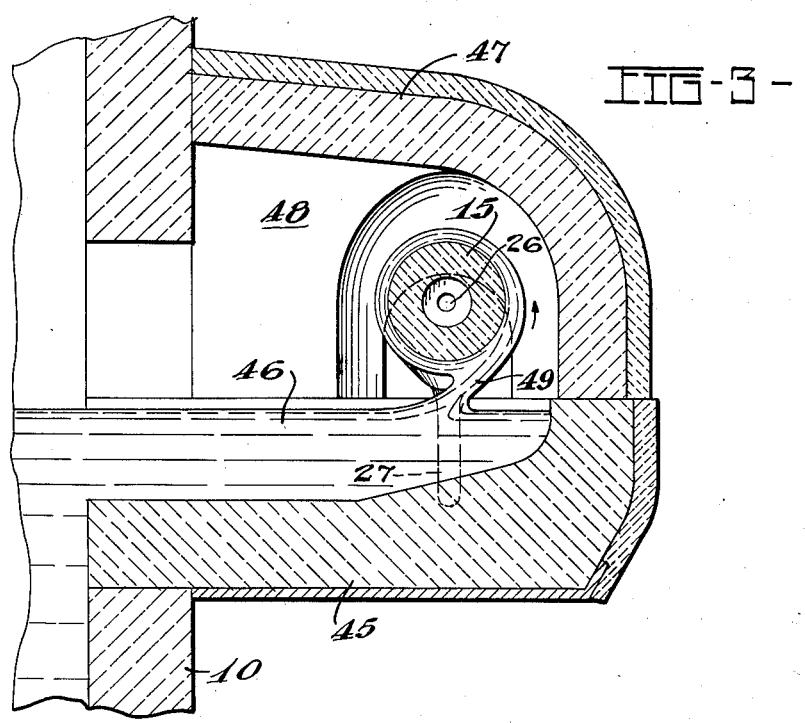
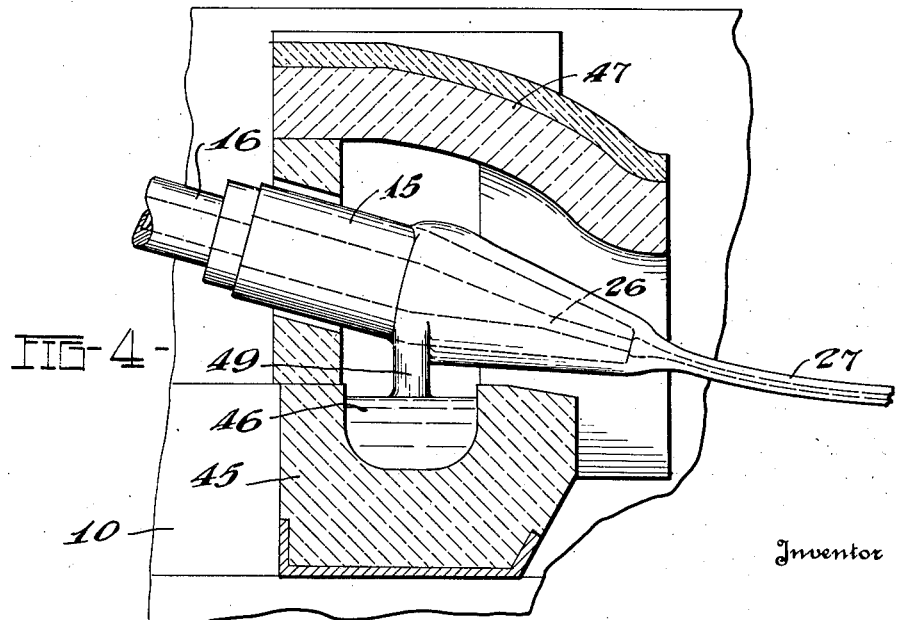
Inventor
Leonard D. Soubier
By J. F. Rule
Attorney Patented Oct. 23, 1934

1,977,956

UNITED STATES PATENT OFFICE 1,977,956

METHOD AND APPARATUS FOR MAKING GLASS CANE

Leonard D. Soubier, Toledo, Ohio, assignor to Owens-Illinois Glass Company, a corporation of Ohio Application May 18, 1933, Serial No. 671,706

4 Claims. (Cl. 49—17.1)

My invention relates to a method and apparatus for forming glass cane or tubing by a continuous process in which a stream of molten glass is wound on a continuously rotating mandrel and flows or is drawn therefrom either in the form of a tube or a solid glass rod.

One method of making glass rods and tubing consists in providing a stream of glass which, under the influence of gravity, is caused to flow vertically downward through space onto a rotating mandrel from which the glass flows or is drawn continuously in the form of a glass rod or tube. The present invention provides a modification of such method and apparatus in which the glass is drawn through space from a supply body of molten glass and wound on a rotating mandrel, the movement of the glass from the supply body to the mandrel being caused by the pull of the mandrel on the glass and in opposition to gravity. The mandrel may be arranged at a level above the supply body of glass and the glass lifted or drawn upward from the supply body by the rotation of the mandrel and wound thereon, the glass being continually drawn from the mandrel in the form of a tube or cane.

Referring to the accompanying drawings:

Fig. 1 is a part sectional elevation of an apparatus constructed in accordance with my invention.

Fig. 2 is a sectional elevation looking in a direction at right angles to that of Fig. 1.

Fig. 3 is a section similar to Fig. 2, showing a modification.

Fig. 4 is a sectional elevation of the same looking in a direction at right angles to that of Fig. 3.

Referring particularly to Figs. 1 and 2, a tank 10 provides a continuous supply of molten glass which flows from the tank through a spout or trough 11 to a chamber 12 provided by a housing 13 at the outer end of the trough. A mandrel 15 made of refractory material is arranged in an inclined position within the chamber 12. The mandrel, as shown, is frusto-conical in shape, being tapered toward its outer or free end and having its axis inclined downward toward its free end. The mandrel is carried at the lower forward end of an inclined shaft 16 which is journaled in a bearing sleeve 17 formed on a standard 18 bolted to the framework 19 which supports the housing 13. The mandrel is rotated continuously as by means of an electric motor 20 having driving connections with the shaft 16, such connections including an endless drive chain 21 and intermeshing gears 22 and 23 mounted respectively on the shaft 16 and a shaft 24 journaled in a bearing 25 in the standard 18. The mandrel 15 is formed with a central bore or passageway 26 which is continued through the shaft 16 and provides a conduit through which air under pressure may be supplied in the usual manner in making hollow tubing.

The mandrel is rotated continuously in a clockwise direction as viewed in Fig. 2. As here shown, the mandrel is spaced forwardly from the outer end of the trough 11, with the upper surface of the mandrel above the level of the floor of said trough or channel. The mandrel as it rotates, draws the glass across the open space between the channel 11 and the mandrel and winds it on the mandrel, providing a surface layer of glass covering the walls of the mandrel. This surface layer forms the nucleus of the rod or tube 27 of glass which continuously flows or is drawn from the mandrel.

In starting the operation, it is necessary to draw the glass from the trough 11 across to the mandrel by means of a bait, after which the mandrel itself serves as a means to continually draw the glass which forms a bridge 28 from the trough to the mandrel. A gate 29 adjustable vertically in the trough 11 regulates the rate of flow.

The glass cane or tubing 27 as it is formed is drawn forward in a horizontal direction between a pair of endless conveyors 30 and 31 running on sprockets 32. A series of rolls 33 are arranged to support and guide the tube in its passage from the mandrel to the conveyors 30 and 31. The rolls 33 are driven by an electric motor 34 through a train of gearing including a worm shaft 35, worm gear 36, an endless chain 37, a shaft 38 driven by said chain, and sprocket chains 39 driven from the shaft 38 and geared to the rolls 33.

A temperature regulating device 40 (Fig. 2) is arranged to direct a temperature regulating medium, as for example, a heating flame or cooling air, into the chamber 12 for maintaining the glass at the desired temperature.

In the modified construction disclosed in Figs. 3 and 4, the furnace tank 10 is provided with a forehearth extension 45. The tank maintains a continuous pool or supply body 46 of molten glass within the forehearth 45. A housing 47 over the forehearth provides a chamber 48 in which the mandrel 15 is located. The mandrel in this instance is directly over the supply body or pool of glass and spaced a short distance above the surface of the glass. The rotation of the mandrel draws the glass upward in a continuous stream or column 49 which bridges the space between the pool and mandrel. The movement of the glass in its passage from the supply body to the mandrel is in an upward direction more or less inclined to the vertical.

Modifications may be resorted to within the spirit and scope of my invention.

What I claim is:

1. The method which comprises continuously rotating a mandrel spaced from a supply body of molten glass, causing a movement of the glass from the supply body through said space in opposition to gravity and causing the glass to be wound around the mandrel, and flowing glass off the mandrel in tubular formation in a direction axial to the mandrel simultaneously with said movement of glass from the supply body to the mandrel.

2. The method of forming glass cane which comprises continuously rotating a mandrel spaced from a supply body of molten glass, causing a movement of the glass from the supply body through said space in opposition to gravity and causing the glass to be wound around the mandrel, and continuously drawing the glass in the form of a cane from the mandrel in a direction axial to the mandrel.

3. The combination of a container for molten glass, a mandrel spaced above the glass in the container, means for continuously rotating the mandrel about an inclined axis and thereby drawing glass upward from the pool or supply body and winding it on the mandrel, said mandrel having its glass receiving surface tapered toward the lower end of the mandrel and extending upwardly and beyond that portion thereof on which the glass is wound, and means for continuously drawing the glass in the form of a rod from the lower end of the mandrel.

4. The combination of a furnace tank, a forehearth extension thereon providing a channel into which the glass flows from the tank, a mandrel having a frusto-conical surface located over said channel with its axis inclined and extending transversely of the channel, means for continuously rotating said mandrel about its said axis and thereby drawing molten glass upwardly in a continuous stream from the channel and winding it on the mandrel, the surface of the mandrel extending laterally and upwardly beyond the area on which the glass is wound, means for drawing the glass continuously from the lower end of the mandrel, and means for supplying air through the interior of the mandrel and thereby giving tubular formation to the glass as it is drawn from the mandrel.

LEONARD D. SOUBIER.